United States Patent Office 2,835,946
Patented May 27, 1958

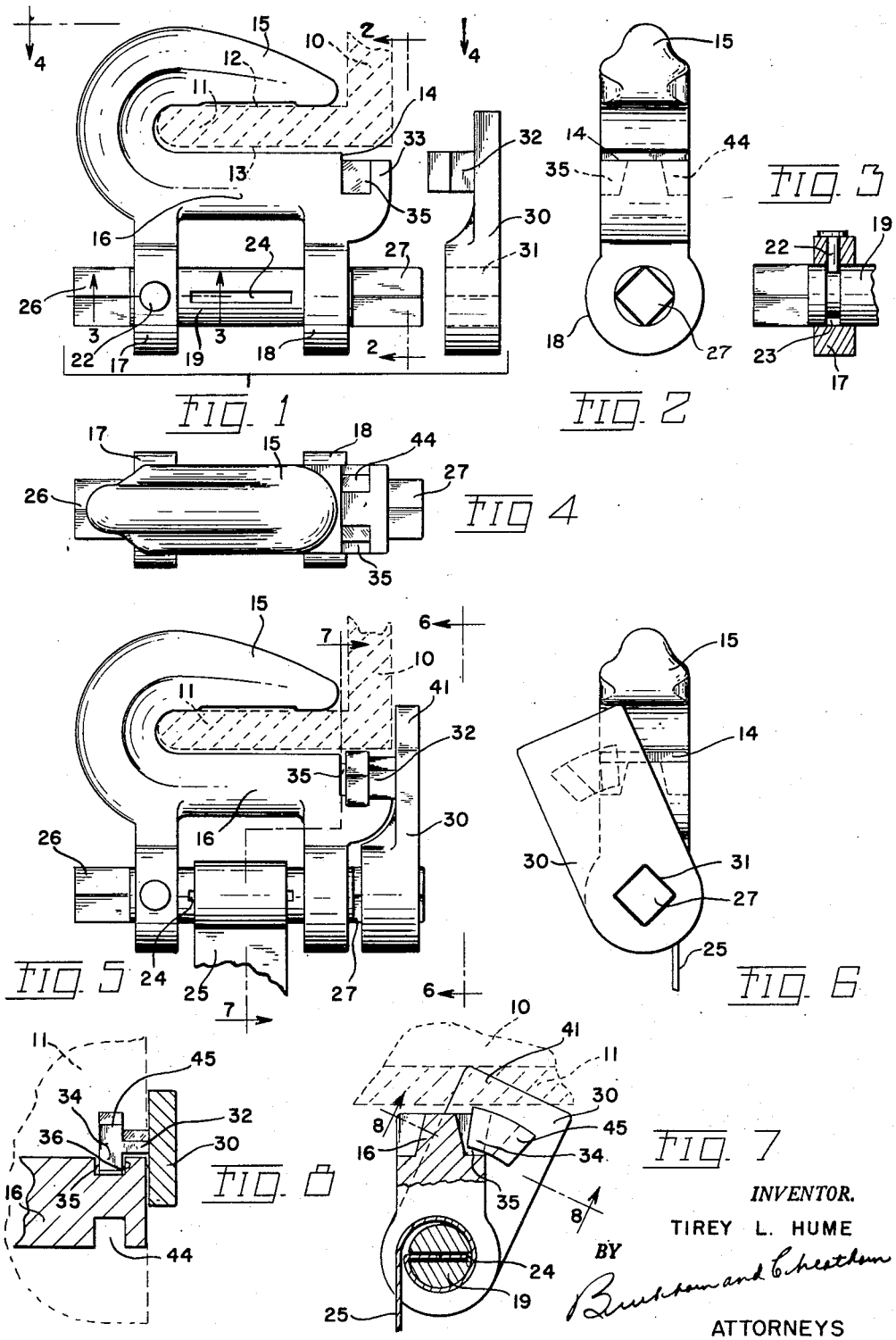

2,835,946

TENSIONING SHORING CLAMP

Tirey L. Hume, Portland, Oreg.

Application October 26, 1953, Serial No. 388,249

7 Claims. (Cl. 24—68)

The present invention relates to an anchoring device and more particularly to a clamping and tensioning device for securing a flexible load bearing shoring strap to a ship hull rib.

It is the practice in ocean going vessels to secure all cargo in place to prevent the cargo from shifting while the vessel is underway. A heavy individual piece of cargo such as machinery may cause damage to the ship or other cargo as well as itself should it shift about. Shifting of such cargo and particularly bulk cargo such as grain may even cause the vessel to list, rendering it less seaworthy.

Because of many desirable features, flexible steel strap has been used to a great extent to secure individual pieces of cargo in place and to secure temporary bulkheads, or "shifting boards" in the case of bulk cargo, to prevent the same from shifting. Heretofore it has been the practice to secur or anchor such strap to a rib of the ship with a specially designed clamp and thereafter tension the strap with a separate tensioning device. A certain amount of inconvenience is attendant with this practice. First, certain of the clamps and tensioning devices provided heretofore have numerous parts requiring deft manipulation. Frequently, however, the clamps and subsequently the tensioning device must be manipulated from an unsteady staging suspended in the hold of a ship whereby the workmen have difficulty in securing and tensioning the strap quickly and properly. Secondly, the clamps frequently shift in position during the initial stages of applying tension to the strap requiring repositioning of the clamp by the workman or even in some cases requiring a workman to hold the clamp while another workman tensions the strap.

It is an object of the invention, therefore, to provide a clamp having an integral strap tensioning device for securing a shoring strap to a ship rib whereby positioning of the clamp and tensioning of the strap is facilitated.

It is a further object of the invention to provide an integral rib clamp and strap tensioning device having means for locking the clamp to the rib until the tension in the strap is relieved.

Another object is to provide a combined clamp and tensioning device that has relatively few operating parts and may be manufactured at low cost.

Other objects and advantages of the invention will become more apparent hereinafter.

In accordance with the illustrated embodiment, the present device comprises a U-shaped clamp or hook portion for engaging the inboard flange of the channel rib and a spooling portion to which a shoring strap may be secured for spooling to tension the same. A keeper member is provided that is locked by the tension of the strap to prevent unspooling of the strap and also to prevent removal of the hook portion from the rib flange. For a more detailed description of the invention, reference is made to the accompanying drawings and the following description thereof.

In the drawings,

Fig. 1 is a partially exploded top view of the device showing the hook portion engaged upon the inboard flange of a ship rib and the keeper member disengaged from the mandrel of the spooling portion;

Fig. 2 is a side view looking in the direction of the arrows 2—2 of Fig. 1;

Fig. 3 is a cross-sectional view taken substantially along line 3—3 of Fig. 1;

Fig. 4 is an end view looking in the direction of the arrows 4—4 of Fig. 1;

Fig. 5 is a view similar to Fig. 1 but with the keeper member engaged on the mandrel and showing a strap wound upon the mandrel;

Fig. 6 is a side view of the device with the keeper member in operative position, the view being taken in the direction of the arrows 6—6 of Fig. 5;

Fig. 7 is a cross-sectional view taken substantially along line 7—7 of Fig. 5; and Fig. 8 is a sectional view taken substantially along line 8—8 of Fig. 7.

Referring first to Fig. 1, the clamping and tensioning device of the invention is particularly adapted for securing shoring straps to ship channels or ribs which comprise a web 10 extending at right angles to the skin or hull (not shown) of a vessel and an inboard flange 11 which extends at right angles to the web along the inboard edge thereof. For convenience of reference, the side of the flange 11 which faces the hull of the ship will be termed the outboard side and is indicated in the drawings by the numeral 12. The opposite side of the flange 11 will be termed the inboard side and is indicated in the drawings by the reference numeral 13.

The device of the invention comprises a body including a U-shaped flange clamp or hook portion having a short leg 15 which is adapted to engage the outboard flange side 12 and a long leg 16 adapted to engage the inboard flange side 13. As indicated in the drawings, the short leg 15 is of substantially the same length as the outboard side 12 of the flange and the long leg 16 is of substantially the same length as the inboard side 13 of the flange, the inboard side being considered herein as the surface extending from the free end of the flange 10 to the right surface of the web 10 as it appears in Fig. 1. The long leg 16 is stepped adjacent its free end as indicated at 14 so as to enlarge the mouth of the opening between the legs and facilitate engagement of the hook on the flange 11.

The device also comprises a spooling portion which will now be described. Projecting from the inboard side of the long leg 16 is a pair of spaced bosses or arms 17, 18, each of which is provided with a substantially circular aperture having coincident axes substantially parallel to the legs 15, 16 whereby to define a clevis. Mounted in the apertures of the bosses 17, 18, is a mandrel 19 having a circular intermediate portion which extends through each of the bosses 17, 18. The mandrel 19 is of slightly lesser diameter than the apertures of the bosses 17, 18, so that the mandrel may be rotated in the openings about its axis. Preferably, means are provided to secure the mandrel 19 from longitudinal movement with respect to the hook portion and in this instance comprises a pin 22 which extends through one of the bosses 17 and engages cooperatively in a circumferential recess 23 formed in the mandrel, as shown in Fig. 3.

A portion of the mandrel 19 positioned between the bosses 17, 18 is provided with a longitudinally extending slot 24 for receiving and securing to the mandrel an end of a flexible strap 25 suitablly anchored at its opposite end. As indicated in Fig. 7, the end of the strap 25 is inserted in the slot 24 and the mandrel 19 then turned, for example, clockwise, to wind the strap upon the mandrel thereby taking up the slack in the strap and tensioning the same. The strap 25 will be secured to the mandrel 19 by reason of the pinching of the strap thereagainst as it is wound and as will be quite apparent to those skilled in the art. The opposite end portions 26, 27 of the mandrel 19 extend outwardly from their respective bosses 17, 18 and are preferably rectangular or of other suitable non-circular configuration to facilitate the engagement of a cooperatively formed tool therewith so that torque may be applied to the mandrel to wind the strap 25 thereupon and tension the same.

Keeper means are provided to prevent unwinding of the strap 25 after the same has been tensioned and the torque applying tools have been disengaged from the end portions 26, 27 of the mandrel. The keeper means comprises an elongate, rigid member 30 having a rectangular aperture 31 in one end thereof in which the end portion 27 of the mandrel is cooperatively received. Projecting from the member 30 is a stop portion or element 32 which is positioned so as to engage the free end of the long leg 16 as the keeper member 30 rotates with the mandrel 19. With particular reference to Figs. 6 and 7, it will be evident that the tension upon the strap 25 would tend to rotate the mandrel 19 counterclockwise. However, upon such rotation the stop element 32 will engage the clamp body at the point indicated by the numeral 33 in Fig. 1 whereby further rotation of the mandrel will be prevented.

To prevent removal of the keeper member 30 from the mandrel end portion 27, interengaging means are provided on the clamp body and the keeper member. Protruding at right angles from the end of the keeper member stop 32 is a catch or tongue 34 which is received within a notch 35 formed in the longer hook leg 16 adjacent the free end thereof. The notch 35 provides a shoulder 36 which faces away from the free end of the long leg 16 and engages the adjacent surface of the catch 34 whereby the keeper member 30 is securely held upon the mandrel end portion 27.

The keeper member 30 is also adapted securely to lock the entire device upon the flange 11. With particular reference to Figs. 5 and 7, it will be seen that the keeper member 30 is of such length that when the catch 34 projects into the notch 35, a nose portion 41 of the member engages the side of the web 10 opposite to that from which the flange 11 projects. Thus the clamp is prevented from shifting toward the free end of the flange 11.

So that the device of the invention will be adapted for spooling in either direction, the opposite side of the long leg 16 may be provided with a notch 44 corresponding the notch 35 and the keeper member 30 may be provided with a projection or catch 45 on the stop member 32 which will engage in the notch 44 if the mandrel is rotated clockwise by the tension of the strap wound thereon.

In using the device, the flange clamp 15, 16 is engaged on the rib flange 11 and the end of the strap 25 to be tensioned threaded through the slot 24. Suitable tools are then engaged with the mandrel end portions 26, 27 and the mandrel rotated to tension the strap 25. When the strap 25 has been tensioned the desired amount, the tool engaging the mandrel end portion 27 is removed and the keeper member 30 engaged thereon, the tool on the mandrel end portion 26 being used to hold the mandrel against the tension of the strap while the keeper member is mounted on the mandrel. When the keeper member 30 has been mounted on the mandrel 19, the force on the tool engaged with the end portion 26 may be relieved to permit the mandrel to rotate under the tensioning force of the strap whereby the stop element 32 will be rotated into engagement with the body of the device to prevent further rotation of the mandrel. At the same time the keeper member catch 34 engages in the notch 35 and the nose portion 41 is positioned adjacent the rib web 10 so that the device is locked in position.

The clamp may be easily disengaged from the flange 11 by relieving the tension of the strap 25 whereupon the keeper member 30 may be rotated clockwise to disengage the catch 34 from the notch 35 and the nose 41 from behind the web 10 whereafter the hooks 15, 16 may be removed from the flange.

One of the many advantages of the present invention is that the device may be positioned on a flange and strap tensioned from a single position of a staging. Moreover, the device is compact and may be manufactured at relatively low cost and manipulated readily.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. In a device of the class described, a body comprising a clamp portion for engaging an anchoring element and a clevis portion, including a pair of spaced arms, a mandrel rotatably mounted in said arms for rotation about a fixed axis, said mandrel comprising a non-circular end portion extending outwardly of said clevis portion, a keeper element having a non-circular aperture complementary to said end portion, and slidably receiving the same, said keeper element comprising a stop portion engaging said body to prevent rotation of said mandrel, and a catch portion protruding from said stop portion and operatively engaged in a complementary notch in said body whereby said keeper element is secured against movement relative to said mandrel in a direction axially thereof.

2. A device for attaching a flexible load bearing member to an anchoring element and tensioning said member, said device comprising a body including means for securing said device to said element, a mandrel, the opposite end portions of said mandrel being of non-circular configuration for receiving a complementarily formed tool for rotating said mandrel, boss means on said body spaced intermediate said end portions and rotatably supporting said mandrel upon said body for rotation about a fixed axis, a keeper element having a non-circular aperture complementary to one of said end portions and slidably engaged upon the same, means on said body defining a shoulder facing away from said one end portion, and abutment means on said keeper engaging said shoulder to prevent accidental removal of said keeper element from said one end portion.

3. A clamping and tensioning device for securing a flexible load bearing member to an anchoring structural member having a web and a flange, said device comprising a U-shaped flange hook portion having a pair of elongate legs adapted for engaging said flange, and a spooling portion having a rotatable mandrel adapted to be secured to said flexible load bearing member for spooling the same, said mandrel having a non-circular portion, a keeper having a non-circular aperture adapted cooperatively to engage said non-circular portion of the mandrel, cooperative interengaging means on said hook portion and said keeper adapted to be brought into engagement by rotation of the mandrel under the tension of the strap and when engaged to prevent removal of said keeper from said mandrel, said keeper including a nose portion adapted to abut said web upon engagement of said interengaging means to prevent removal of said hook portion from said flange.

4. A clamping and tensioning device for securing a flexible load bearing member to an anchoring structural member having a web and a flange, said device comprising a U-shaped hook having a pair of elongate legs for engaging said flange therebetween, a pair of bosses on one of said legs, a mandrel journaled in said bosses for rotation about a fixed axis substantially parallel to said legs and having a non-circular end portion extending outwardly of said legs, said mandrel being adapted for connection to said flexible member for winding the latter thereabout to apply tension to the same, and a keeper element having a non-circular aperture adapted to slidably engage said non-circular end portion, said keeper element being adapted to be mounted upon said mandrel after tensioning of said flexible member, said keeper element including a stop portion positioned to engage said hook whereby to prevent rotation of said mandrel and unwinding of said tensioning member.

5. A clamping and tensioning device for securing a flexible shoring strap to a ship hull rib having a web and inboard flange extending at right angles to said web, said device comprising a U-shaped hook having a short leg adapted to abut the outboard side of said flange and a long leg adapted to abut the inboard side of said flange, said legs being of a length substantially equal to the width of the respective side of said flange, a pair of spaced apart bosses on said long leg projecting therefrom relatively away from said short leg, a mandrel journaled in said bosses for rotation about an axis substantially parallel to said legs, said mandrel being adapted for securing said strap thereto, each of the opposite ends of said mandrel extending outwardly of said bosses and being of non-circular configuration to receive a tool for applying rotational torque to said mandrel so as to wind said strap thereupon, a keeper having a non-circular aperture therein adapted cooperatively to receive the end of said mandrel adjacent the free end of said long leg, means on said long leg defining a shoulder facing away from the free end thereof, said keeper having a tongue thereon adapted to engage behind said shoulder to prevent removal of said keeper from said mandrel end, said keeper including a nose portion adapted to engage the side of said web adjacent the free end of said long leg when said tongue engages said shoulder whereby to prevent removal of said hook from said flange.

6. A clamping and tensioning device for securing a flexible shoring strap to a ship hull rib having a web and an inboard flange extending at right angles to said web from one side thereof, said device comprising a flange hook including a U-shaped portion having a first and a second elongate leg adapted to receive said flange therebetween with said first leg adjacent the outboard side of said flange and said second leg adjacent the inboard side of said flange, a pair of spaced apart lugs on said second leg projecting therefrom relatively away from said first leg, a mandrel journaled in said lugs for rotation about an axis substantially parallel to said legs, said mandrel having an axially parallel slot therethrough for receiving said strap, each of the opposite ends of said mandrel extending outwardly of said lugs and being of non-circular configuration to receive a tool for applying rotational torque to said mandrel, and a keeper having a non-circular aperture therein adapted cooperatively to receive an end of said mandrel whereby said keeper may be mounted on said end after said mandrel has been rotated to tension said strap, cooperative interengaging means on said keeper and said hook adapted to engage to prevent removal of said keeper from said mandrel end and to prevent rotation of said mandrel, said keeper including a nose portion adapted to engage the side of said web opposite said flange upon engagement of said interengaging means whereby to prevent removal of said hook from said flange.

7. A clamping and tensioning device for securing a flexible shoring member to a ship hull rib having a web and an inboard flange extending at right angles to said web from one side thereof, said device comprising a flange hook including a U-shaped portion having a first and a second elongate leg adapted to receive said flange therebetween with said first leg adjacent the outboard side of said flange and said second leg adjacent the inboard side of said flange, a spooling device mounted on the inboard side of said second leg including a mandrel journaled for rotation about an axis substantially parallel to said legs, said mandrel being adapted to be secured to said flexible shoring member, each of the opposite ends of said mandrel extending outwardly of said lugs and being of non-circular configuration to receive a tool for applying rotational torque to said mandrel for spooling said member thereupon, and a keeper having an aperture therein adapted cooperatively to receive an end of said mandrel whereby said keeper may be mounted on said end after said mandrel has been rotated to tension said member, cooperative interengaging means on said keeper and said flange hook adapted to engage to prevent rotation of said mandrel and to prevent removal of said keeper from said mandrel end, said keeper including a nose portion adapted to engage the side of said web opposite said flange upon engagement of said interengaging means whereby to prevent removal of said hook from said flange.

References Cited in the file of this patent

UNITED STATES PATENTS

| 570,090 | Haley | Oct. 27, 1896 |
| 898,899 | Keck | Sept. 15, 1908 |
| 963,397 | Roulstone | July 5, 1910 |
| 1,657,190 | Ballou | Jan. 24, 1928 |
| 1,948,652 | Edmunds | Feb. 27, 1934 |
| 1,963,436 | Dumke | June 19, 1934 |
| 2,531,816 | Homoky | Nov. 28, 1950 |

FOREIGN PATENTS

| 333,329 | Germany | Feb. 23, 1921 |
| 648,491 | France | Dec. 10, 1928 |